(12) United States Patent
Martin et al.

(10) Patent No.: US 12,313,052 B2
(45) Date of Patent: May 27, 2025

(54) EXPANSION CHAMBER FOR PROGRESSIVE SEALING SYSTEM

(71) Applicant: Dover Pumps & Process Solutions Segment, Inc., Downers Grove, IL (US)

(72) Inventors: Jason Craig Martin, Louisville, KY (US); Rahul Yadav, Jaipur (IN)

(73) Assignee: Dover Pumps & Process Solutions Segment, Inc., Downers Grove, IL (US)

( * ) Notice: Subject to any disclaimer, the term of this patent is extended or adjusted under 35 U.S.C. 154(b) by 0 days.

(21) Appl. No.: 17/834,618

(22) Filed: Jun. 7, 2022

(65) Prior Publication Data
US 2022/0389922 A1 Dec. 8, 2022

(30) Foreign Application Priority Data
Jun. 8, 2021 (IN) ............................. 202111025534

(51) Int. Cl.
*F04B 39/04* (2006.01)
*F04B 39/00* (2006.01)
(Continued)

(52) U.S. Cl.
CPC ........ *F04B 39/041* (2013.01); *F04B 39/0022* (2013.01); *F04B 39/121* (2013.01);
(Continued)

(58) Field of Classification Search
CPC .... F04B 39/041; F04B 39/045; F04B 39/121; F04B 53/16; F16J 15/004; F16J 15/006;
(Continued)

(56) References Cited

U.S. PATENT DOCUMENTS

| | | | |
|---|---|---|---|
| 2,172,141 A | | 9/1939 | King |
| 3,076,659 A | * | 2/1963 | Kremer, Jr. ............... F16J 15/28 277/543 |

(Continued)

FOREIGN PATENT DOCUMENTS

| | | | |
|---|---|---|---|
| CN | 101832248 | | 9/2010 |
| CN | 112049939 A | * | 12/2020 ............... F16J 15/56 |

(Continued)

OTHER PUBLICATIONS

CN112049939A_t machine translation. (Year: 2020).*
(Continued)

*Primary Examiner* — Matthew Wiblin
(74) *Attorney, Agent, or Firm* — Fish & Richardson P.C.

(57) ABSTRACT

A progressive sealing system for a reciprocating machine includes a pressure breaker having a first seal, and one or more additional seals between the pressure breaker and an end plate. One or more seal housings hold the seals between the first seal and the end plate. The end plate couples the progressive sealing system to a housing of a cylinder of the reciprocating machine such that a surface of the first seal faces a chamber of the cylinder. A housing for the second one of the seals includes a bore having an inner surface. The inner surface of the bore of the second seal housing and an outer surface of a rod of the reciprocating machine define an annular space when the rod is received in the bore. The packing case includes an expansion chamber adjoining the annular space.

21 Claims, 10 Drawing Sheets

(51) Int. Cl.
*F04B 39/12* (2006.01)
*F16J 15/00* (2006.01)
*F16J 15/18* (2006.01)
*F16J 15/26* (2006.01)

(52) U.S. Cl.
CPC ........... *F16J 15/004* (2013.01); *F16J 15/006* (2013.01); *F16J 15/188* (2013.01); *F16J 15/189* (2013.01); *F16J 15/26* (2013.01)

(58) Field of Classification Search
CPC .......... F16J 15/188; F16J 15/189; F16J 15/26; F16J 15/447
See application file for complete search history.

(56) References Cited

U.S. PATENT DOCUMENTS

| | | | |
|---|---|---|---|
| 3,147,982 A | 9/1964 | Klein | |
| 3,386,346 A | 6/1968 | Halpin | |
| 3,542,374 A | 11/1970 | Neilson et al. | |
| 3,544,118 A * | 12/1970 | Klein | F16J 15/006 |
| | | | 277/927 |
| 3,658,348 A * | 4/1972 | Nink | F16J 15/26 |
| | | | 92/165 R |
| 3,687,577 A | 8/1972 | Henry et al. | |
| 3,698,726 A * | 10/1972 | Schettler | F16J 15/26 |
| | | | 277/540 |
| 3,711,104 A | 1/1973 | Henry | |
| 3,756,611 A * | 9/1973 | Wikelski | F16J 15/26 |
| | | | 277/500 |
| 3,945,649 A | 3/1976 | Nakamura | |
| 4,153,395 A | 5/1979 | O'Neill | |
| 4,222,575 A | 9/1980 | Sekiguchi et al. | |
| 4,329,126 A | 5/1982 | Nishimura | |
| 5,421,892 A | 6/1995 | Miyagi | |
| 6,286,837 B1 | 9/2001 | Humphrey | |
| 6,481,720 B1 | 11/2002 | Yoshida et al. | |
| 6,932,351 B1 | 8/2005 | Mowll | |
| 7,255,136 B2 | 8/2007 | Templet et al. | |
| 8,061,984 B2 | 11/2011 | Kuzdzal et al. | |
| 8,156,856 B2 | 4/2012 | Abe | |
| 8,540,479 B2 | 9/2013 | Awtar et al. | |
| 9,217,508 B2 | 12/2015 | Quarmby et al. | |
| 9,488,187 B2 | 11/2016 | Bardon et al. | |
| 10,273,952 B2 * | 4/2019 | Trevino | F04B 53/04 |
| 11,788,541 B2 | 10/2023 | Kvachnev | |
| 2002/0085937 A1 | 7/2002 | Gennami et al. | |
| 2005/0206087 A1 | 9/2005 | Hogg et al. | |
| 2005/0206090 A1 | 9/2005 | Bunn | |
| 2011/0298183 A1 | 12/2011 | Lindner-Silwester et al. | |
| 2017/0321697 A1 | 11/2017 | Beinert et al. | |
| 2017/0335966 A1 | 11/2017 | Werdecker et al. | |
| 2020/0072229 A1 | 3/2020 | Kjellnes et al. | |
| 2021/0355954 A1 | 11/2021 | Kvachnev | |

FOREIGN PATENT DOCUMENTS

| | | | |
|---|---|---|---|
| DE | 1132681 | 7/1962 | |
| DE | 1144873 | 3/1963 | |
| EP | 0576859 | 1/1994 | |
| EP | 1805437 | 7/2007 | |
| EP | 2376819 | 7/2010 | |
| GB | 1342707 | 1/1974 | |
| JP | S5367104 | 6/1978 | |
| JP | s59222673 A * | 12/1984 | ............. F16J 15/006 |
| JP | S62118075 | 5/1987 | |
| JP | 2007533888 | 11/2007 | |
| JP | 2009209905 | 9/2009 | |
| JP | 2017026044 | 2/2017 | |
| JP | 2017089595 | 5/2017 | |
| JP | 2018503038 | 2/2018 | |
| JP | 6577343 | 9/2019 | |
| RU | 2082488 | 6/1997 | |
| WO | WO 2006/042866 | 4/2006 | |
| WO | WO 2020/157141 | 8/2020 | |

OTHER PUBLICATIONS

JPS59222673A_t machine translation (Year: 1984).*
International Preliminary Report on Patentability in International Appln. No. PCT/US2021/032937, dated Jun. 23, 2022, 15 pages.
International Search Report and Written Opinion in International Appln. No. PCT/US2021/032937, dated Sep. 15, 2021, 10 pages.
International Search Report and Written Opinion in International Appln. No. PCT/US2022/072822, dated Sep. 16, 2022, 13 pages.
Vetter et al., "Investigation of the operational behaviour of dry-running piston-rod sealing systems in crosshead compressors," Reliability and economics of compression systems—recent trends in the market of reciprocating compressors, Vienna, Austria, Mar. 27-28, 2003; Proceedings of the 3rd EFRC Conference, 2003, pp. 11-21.
Extended European Search Report in European Appln No. 23200929.0, mailed on Jan. 3, 2024, 7 pages.
International Preliminary Report on Patentability in International Appln. No. PCT/US2022/072822, dated Dec. 21, 2023, 8 pages.
Notice of Opposition Appln No. 21733259.2. mailed on Jul. 9, 2024, 122 pages.
Office Action in Japanese Appln. No. 2022-569521, mailed on Jul. 16, 2024, 10 pages (with English translation).
Reciprocating Compressors: Operation and Maintenance, 1st ed., Bloch (ed)., Oct. 1996, Chapter 3: 167-176, 17 pages.

* cited by examiner

FIG. 14

EXPANSION CHAMBER FOR PROGRESSIVE SEALING SYSTEM

CROSS REFERENCE TO RELATED APPLICATION(S)

This application claims the benefit of Indian Application No. 202111025534, filed on Jun. 8, 2021, and entitled "Expansion Chamber for Progressive Sealing System," the entire contents of which is incorporated by reference herein.

TECHNICAL FIELD

This invention relates to sealing shafts of high pressure gas processing equipment such as reciprocating compressors, particularly with progressive sealing systems.

BACKGROUND

Progressive or multistage sealing systems are commonly employed when high differential pressures are to be maintained, such as between atmosphere and a high pressure cavity into which a moving shaft extends. Effective, reliable sealing often requires a sealing system in which pressure is reduced along the shaft in stages, or progressively along a labyrinth. The compression industry strives to increase maximum allowable working pressure and system speed as required by heightened customer specifications. However, increasing differential pressure typically makes it more difficult to contain gas within the system and can also apply more stress on associated sealing elements, thereby increasing pressure pulsation within the system, consumption of lubrication oil, and undesired emission of gas to the atmosphere. The pressures encountered in operation result in wear on the seals and reduced reliability.

The compressor stroke of a reciprocating compressor is a dynamic event that occurs in a very short timeframe (e.g., 20 times per second for a 1200 RPM compressor). Packing cases for reciprocating compressors operate with a series of rod rings in individual housings. The first rod ring (closest to the compression cylinder) is typically called a pressure breaker. The pressure breaker meters the flow of gas into and out of the packing case. A typical pressure breaker includes one or more plates or rings around the reciprocating shaft of the compressor.

Pressure breakers may reduce stress and wear on the remaining seals of the packing case. Nevertheless, some pressure breakers with relatively large effective flow areas may not adequately protect the remaining seals of the packing case. On the other hand, pressure breakers with relatively small flow areas may themselves be susceptible to high stresses and premature failure.

SUMMARY

One aspect of the invention features a progressive sealing system for a reciprocating machine. The progressive sealing system includes a pressure breaker having a first seal, and one or more additional seals between the pressure breaker and an end plate. One or more seal housings hold the seals between the first seal and the end plate. The end plate couples the progressive sealing system to a housing of a cylinder of the reciprocating machine such that a surface of the first seal faces a chamber of the cylinder. A housing for the second one of the seals includes a bore having an inner surface. The inner surface of the bore of the second seal housing and an outer surface of a rod of the reciprocating machine define an annular space when the rod is received in the bore. The packing case includes an expansion chamber adjoining the annular space. The expansion chamber reduces pressure on the seals of the progressive sealing system during reciprocation.

In some embodiments, the expansion chamber includes an annular groove in an inner surface of the housing for the second seal. The annular groove adjoins an annular space between the housing and the rod. The expansion chamber can be proximate to the first seal. The expansion chamber can divert a portion of the gas flow from the annular space between the rod and the housing during reciprocation.

In some cases, the expansion chamber reduces peak gas pressure on the seals during reciprocation. The expansion chamber can also reduce a rate of change of pressure on the seals. In some embodiments, the expansion chamber slows a fill rate of an intermediate pressure space between the first seal and the second seal during reciprocation.

Another aspect of the invention features a reciprocating compressor with a compression cylinder, a driver, a rod coupled between the driver and the compression cylinder, and a packing case through which the rod passes. The compression cylinder defines a compression chamber. The driver reciprocates the rod such that gas is compressed in the compression chamber. The packing case inhibits gas from flowing out of the compression chamber during reciprocation. The packing case includes a pressure breaker having a first seal through which the rod passes. The pressure breaker meters a flow of gas in and out of the packing case. The packing case also has a second seal through which the rod passes outside of the first seal, and a housing that holds at least one of the first seal and the second seal. The packing case defines an expansion chamber that reduces pressure in an intermediate pressure space between the pressure breaker and the first seal during reciprocation.

In some embodiments, the expansion chamber includes a head portion and a neck portion. The neck portion adjoins the annular space. The head portion is wider than the neck portion. In some cases, the expansion chamber includes a lobed annular groove in a surface of the housing. In other cases, the expansion chamber includes an annular groove with a sloping bottom.

In some cases, the expansion chamber includes a bell-shaped annular groove in an inner surface of a seal housing.

In certain cases, a progressive sealing system includes at least one additional expansion chamber that reduce pressure on at least one of the seals during reciprocation. In some cases, an additional expansion chamber is between the expansion chamber and the second seal. In other cases. In some cases, an additional expansion chamber is between the second seal and the end plate.

In another aspect of the invention, a method of sealing a compression chamber of a reciprocating machine includes positioning a housing that defines an expansion chamber in a stack of seals of a packing case, positioning a pressure breaker ring in front of the housing to create an intermediate pressure space that includes the expansion chamber, and coupling the packing case with a rod.

In some cases, the method includes removing the packing case from the reciprocating machine, and replacing an existing housing behind the pressure breaker with the housing that defines an expansion chamber.

In another aspect of the invention, a method of reducing wear on seals of a packing case to extend reliability and useful life of the seals includes forming an expansion chamber in a seal housing of the packing case, positioning the seal housing in front a stack of seals of the packing case;

and positioning a pressure breaker ring in front of the seal housing to create an intermediate pressure space that includes the expansion chamber between the pressure breaker ring and the stack of seals.

In another aspect of the invention, a housing for a seal of a packing case includes a first bore that receives a seal, and a second bore including an inner surface. The second bore defines an expansion chamber along a portion of the inner surface.

Embodiments described herein may have particular utility in the context of a gas processing system with a high pressure vessel, such as a reciprocating compressor.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

Like reference numbers in different figures indicate similar elements.

DETAILED DESCRIPTION

Figure 1:
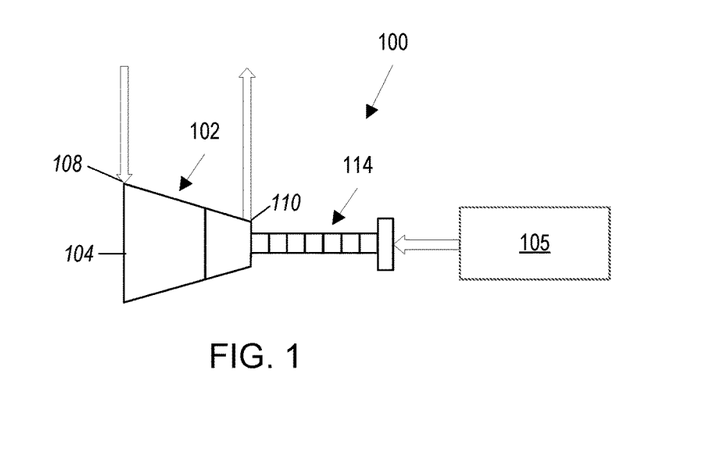
FIG. 1 schematically represents a single stage gas processing system with a multistage sealing system.

Referring first to FIG. 1, gas processing system 100 includes a compressor 102 having a vessel 104 and a driver 105. Vessel 104 defines a cavity 106 with a process gas inlet 108 and a process gas outlet 110. Compressor 102 can be, for example, a positive displacement compressor. In some cases, compressor 102 is a reciprocating compressor, such as a double acting compressor. Vessel 104, configured to contain process gas, is operatively coupled to a shaft that extends into the compressor. A multistage sealing system 114, represented here by a series of boxes along the shaft, inhibits process gas leakage along the shaft. In some embodiments, adjacent seals are adjacent portions of a continuous labyrinth seal. The shaft transfers mechanical energy to process gas in vessel 104 (e.g., by or translating along its longitudinal axis), and extends through multistage sealing system 114 into cavity 106.

Driver 105 supplies mechanical energy to operate gas processing system 100. In some embodiments, driver 105 may be, for example, an internal combustion engine with a crankshaft, or an electric motor that drives a shaft of compressor 102.

Figure 2:
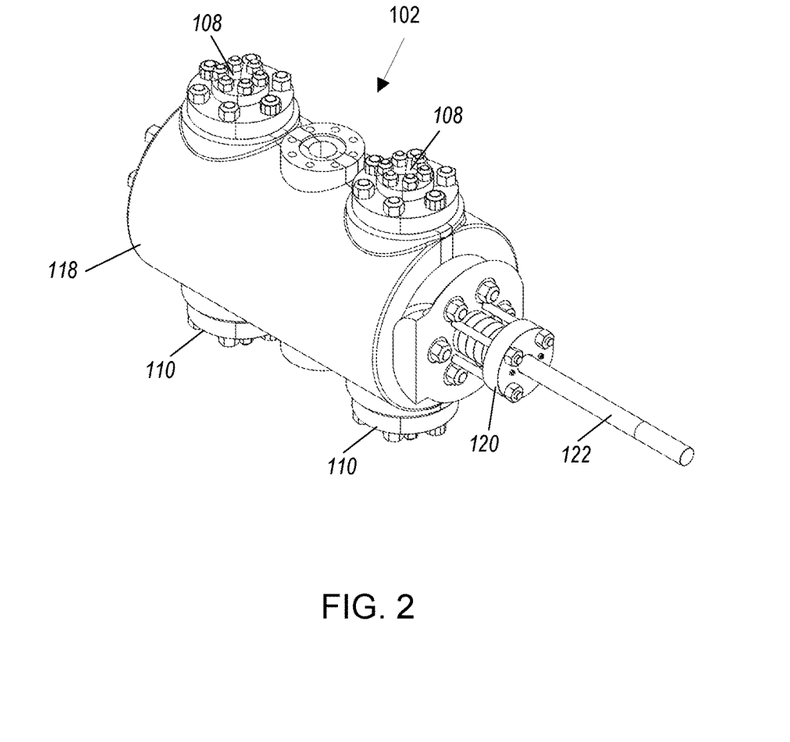
FIG. 2 is a perspective view of a portion of a reciprocating shaft compressor.

Referring next to FIG. 2, a cylinder of compressor 102 has a housing 118 and an end plate 120 that bolts to the housing and through which a shaft 122 extends. In some cases, housing 118 is in two pieces, with a cast iron piece forming the main cylinder and a steel bulkhead bolted to the end of the cylinder to contain the sealing system. Compressor 102 can be a linear reciprocating compressor with two inlets 108 and two outlets 110. Shaft 122 can be operatively coupled to a driver.

Figure 3:
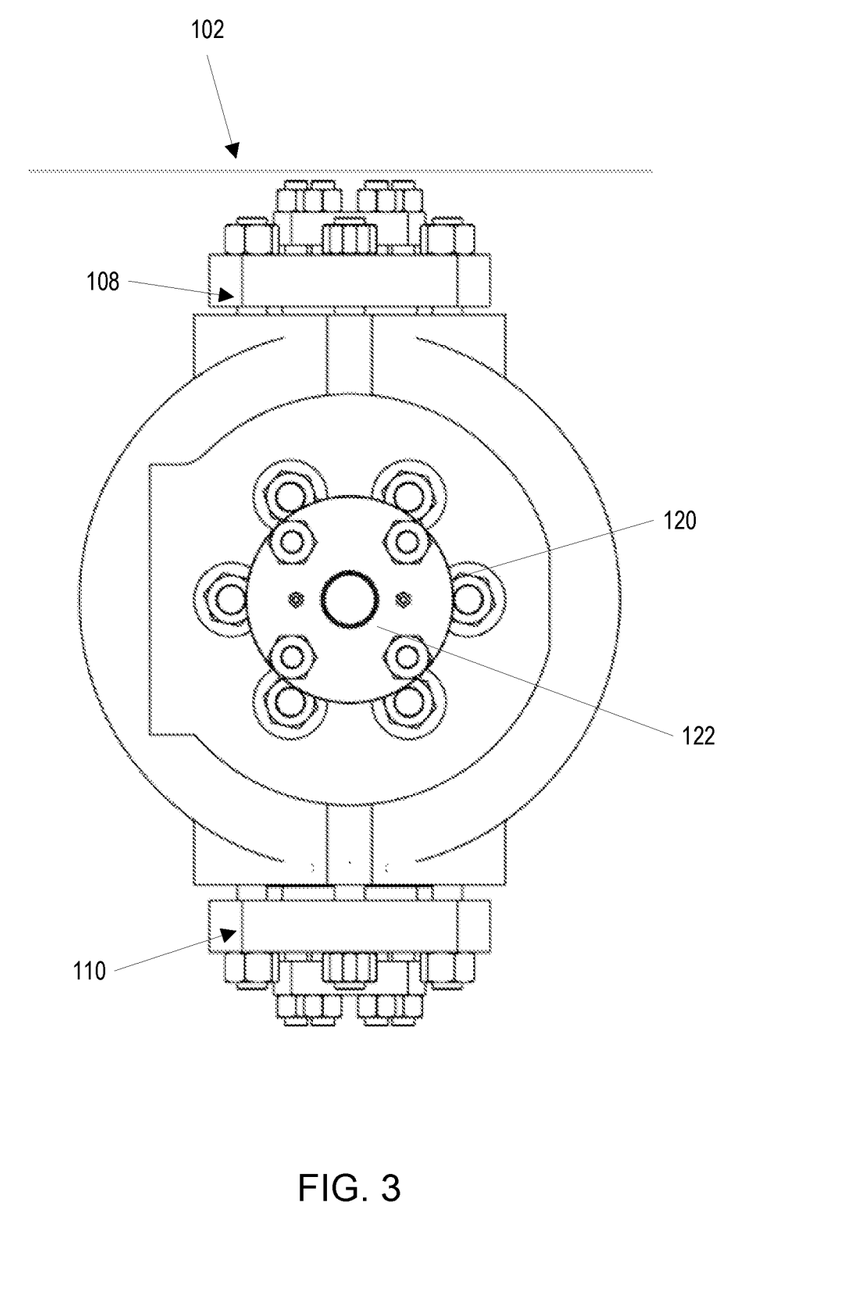
FIG. 3 is an end view of the compressor portion of a gas processing system.

FIG. 3 is an end view of the compressor portion of a gas processing system. Compressor 102 includes end plate 120, inlets 108, and outlets 110. Shaft 122 passes through end plate 120.

Figure 4:
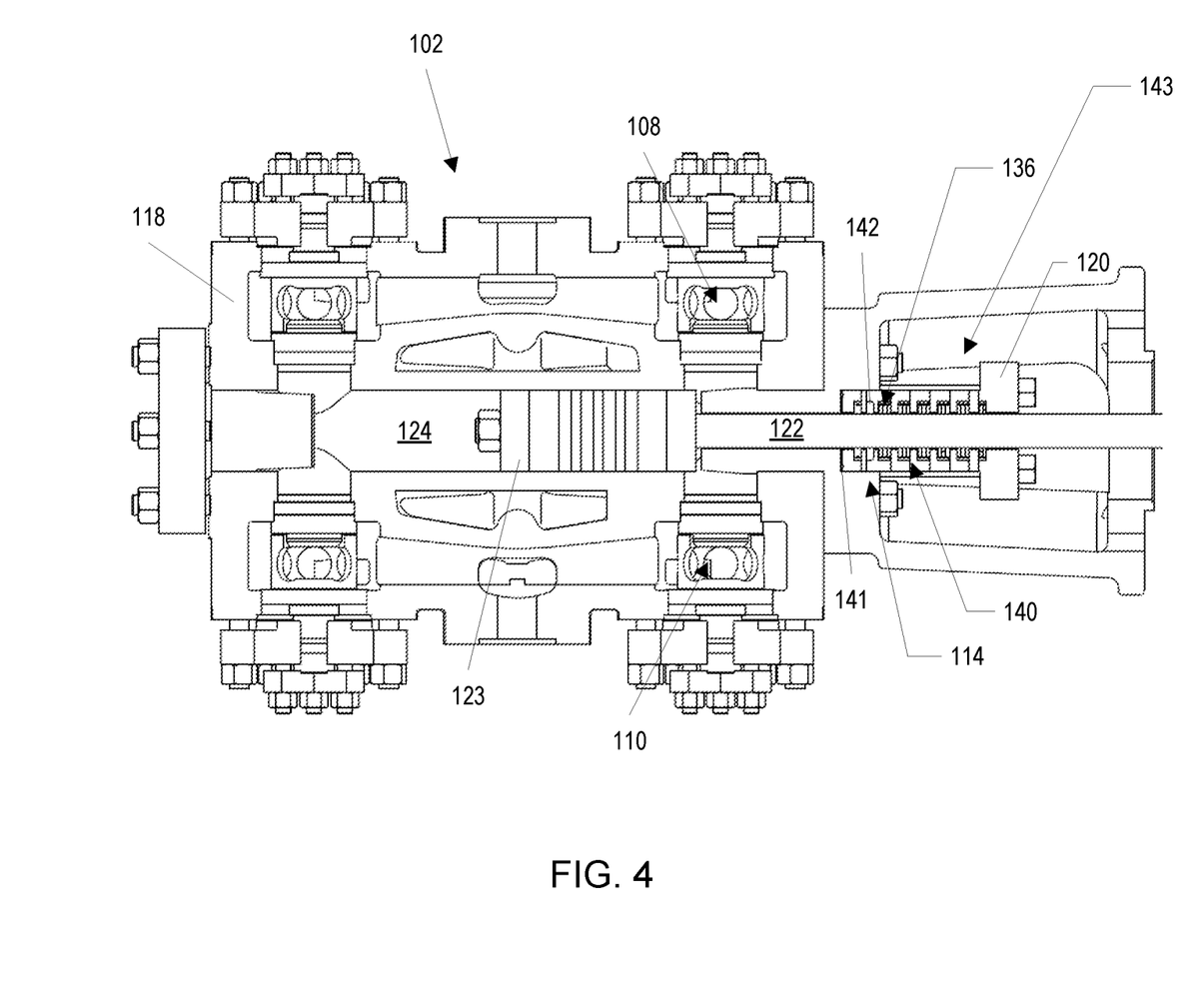
FIGS. 4 and 5 are cross-sectional views, both taken along line 4/5-4/5 in FIG. 3, showing the shaft at opposite ends of its stroke.
Figure 5:
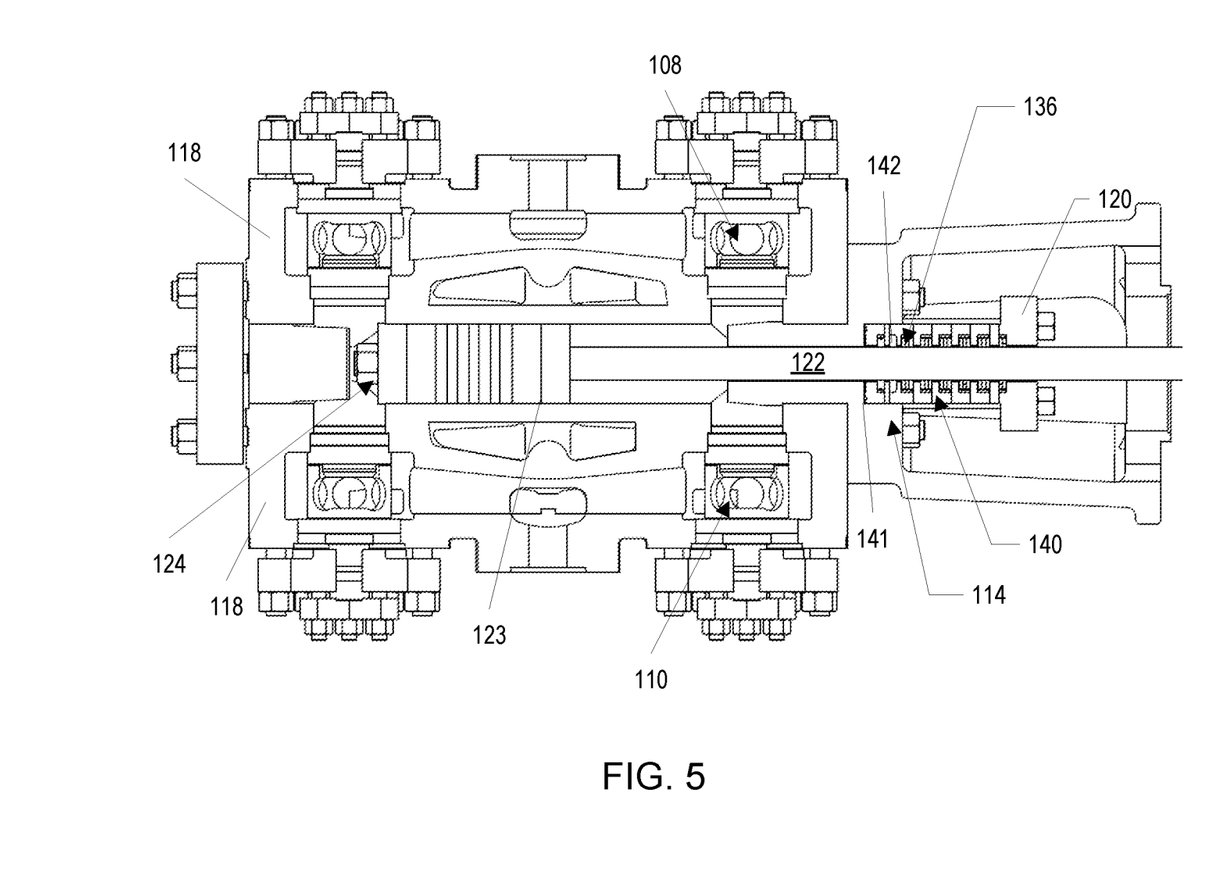

Referring next to FIGS. 4 and 5, piston 123 is provided at the end of shaft 122. Housing 118 defines cylinder chamber 124. The end of shaft 122 that is opposite piston 123 can be coupled to a driver. In operation, piston 123 and a portion of shaft 122 can be driven to reciprocate in cylinder chamber 124, for example, between the positions shown in FIGS. 4 and 5. (the shaft of compressor 102 that carries piston 123 may also be referred to as a "rod").

Multistage sealing system 114 is disposed about shaft 122. In this example, multistage sealing system 114 includes six seals 136 spaced along the shaft, and a pressure breaking rod ring 138. Multistage sealing system 114 can be provided in the form of a packing case for compressor 102. Each seal can include multiple sealing elements or rod rings stacked close together on the shaft, to form a tight series of sealing interfaces with the shaft. In this case, pressure breaking rod ring 138 is a single element seal forming the first seal of the multistage sealing system. Pressure breaking rod ring 138 can control leakage to regulate backflow into the cylinder during the suction stroke and to avoid damaging rings and disengaging them from the rod. Pressure breaking rod ring 138 may also reduce gas flow out of the cylinder on the discharge stroke. In certain implementations, pressure breaking rod ring 138 can be modified to provide an optimal effective orifice in relation to the flow expected to be returned from behind the rod ring to the inlet, as discussed below. The term 'seal' does not imply that there is zero clearance at the shaft surface, or that there is no leakage across the seal. As will be understood by those working in the field of high pressure gas machinery, some leakage will be expected past high pressure differential seals, and may even be necessary to avoid high friction and premature seal failure. Expansion of gas between the seals and shaft surface can create a beneficial cooling of the shaft, resulting in lower seal wear.

As shown in these cross-sections, the multistage sealing system comprises and pressure breaking rod ring housing 139 and multiple seal housings 140 stacked along the shaft and disposed within a bore of housing 118. The innermost seal housing is sealed against a face of the cylinder housing by a nose gasket 141. Each seal housing 140 contains a respective seal 136, with the outermost seal (a dual acting ring) contained within end plate 120. Each seal 136 can be a stack of multiple elements, such as a seal ring sandwiched between two other rings that support the sealing function.

The seal housing 140 just to the driver-side of the pressure breaking rod ring 138 includes expansion chamber 142. (For explanatory purposes, when describing the relative position of components or features of a system, "driver-side" may also be referred to herein as "crank-side" or "outside"). In the example shown in FIGS. 4 and 5, expansion chamber 142 includes an annular bore on the inside face of the seal housing just outside of pressure breaking rod ring 138. As further described below, expansion chamber 142 can divert gas flow and increase fill volume in an intermediate pressure space between pressure breaker rod ring 138 and the next set of seal rings to decrease peak gas pressure and/or a rate of change of pressure in the seal elements of multistage sealing system 114.

In FIGS. 4 and 5, progressive sealing system 114 is implemented by way of a packing case 143. Expansion chamber 142 is an open chamber located just behind the pressure breaker 138. As will be further described below, this open chamber adds volume to slow the rise in pressure before the remaining packing rings as gas passes though the pressure breaker. This reduces both the peak gas pressure and rate of change of pressure experienced by those packing rings, reducing stresses and wear on those rings and extending their wear life.

Figure 6:
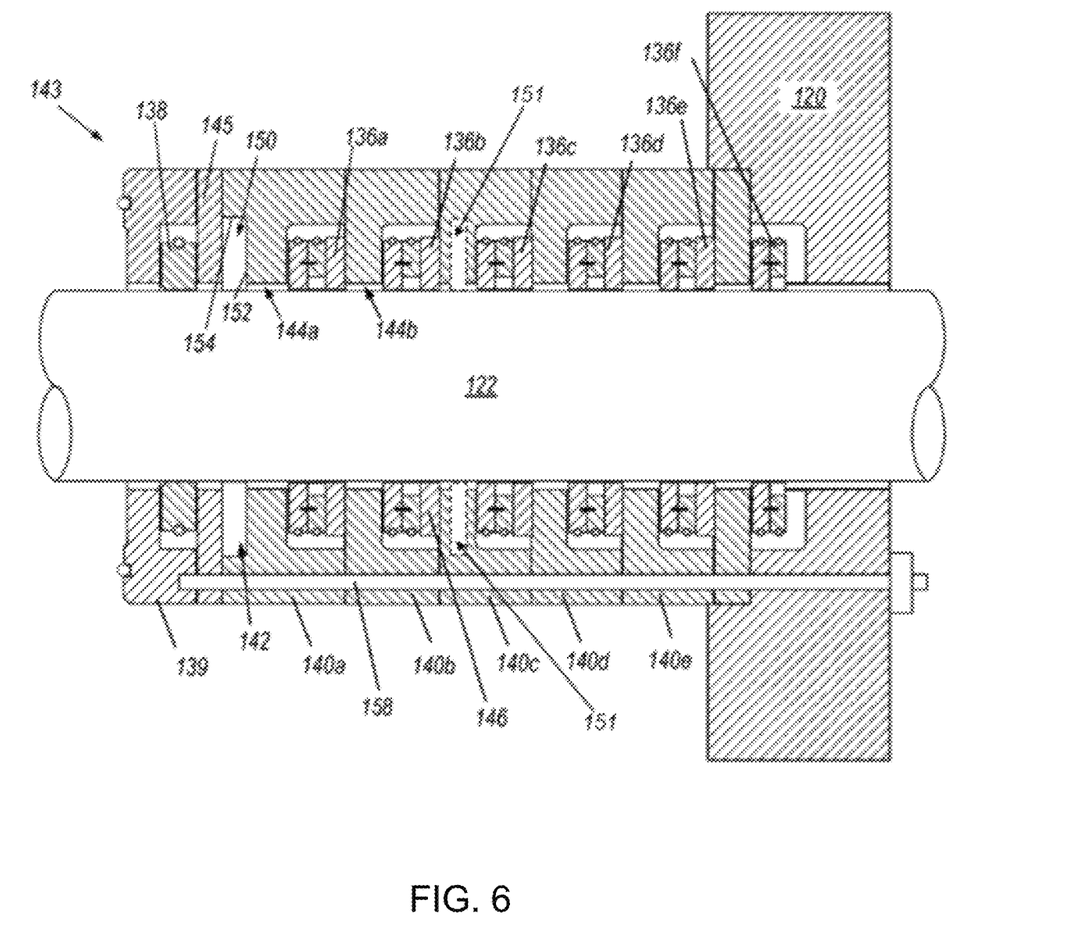
FIG. 6 is a partial cross-sectional view of the multi-stage sealing system, taken along line 6-6 in FIG. 3.

FIG. 6 further illustrates progressive sealing system 114 with expansion chamber 142. Packing case 143 includes seals 136a, 136b, 136c, 136d, 136e and 136f. Pressuring breaking rod ring 138 is held between pressure breaking rod ring housing 139 and plate 145. Each of seal housings 140a, 140b, 140c, 140d, and 140e can be a cup with a through-bore that receives shaft 122, and a larger bore that accommodates the rod rings of its corresponding seal.

Progressive sealing system 114 defines pressure spaces along the shaft surface, bounded by the various seals. Moving from the high pressure end of the sealing system to the atmospheric pressure end, high pressure process gas leaking past the pressure breaking rod ring first reaches intermediate pressure space 144a between pressure breaking rod ring 138 and the first seal 136a, which consists of three stacked sealing elements or rod rings 146.

Further leakage past seal 136a reaches pressure space 144b, which may be at a pressure, for example, of about 500 psig. Thus, in operation the multistage sealing system defines a series of pressure spaces at progressively decreasing pressures along the shaft, with each seal creating a differential pressure between two pressure spaces. The amount of running leakage past a seal, and the pressure differential across the seal, are interrelated. In general, the higher the pressure differential across a seal, the greater the running friction of the seal and the greater the heat generation at the seal.

In the example shown in FIG. 6, expansion chamber 142 is in the form of annular bore 150 in the inside face of second seal housing 140a. Expansion chamber 142 is defined by a bottom surface 152 of bore 150 and an outside surface 154 of bore 150.

The expansion chamber 142 is adjacent to, and in fluid communication with, an annular space between the outer surface of shaft 122 and an inner surface of the shaft bore of seal housing 140a.

Expansion chamber 142 results in an increased volume of an intermediate pressure space 144a between pressure breaker 138 and seal 136a. The increase in volume of intermediate 144a can slow a fill rate of a gas in intermediate pressure 144a. In operation, a portion of the gas flowing across the shaft in the annular space between pressure breaker 138 and seal 136a may be diverted into expansion chamber 142. Expansion chamber 142 can reduce peak gas pressure and a rate of change in pressure on seal 136a and the remaining seals outside of the seal 136a (namely, seals 136b, 136c, 136d, 136e, and 136f). In some cases, a packing case including an expansion chamber may achieve the same effect as using a highly restrictive pressure breaker, but without an increased the risk of failure. One or more additional expansion chambers (e.g., additional expansion chamber 151) can be included.

Compressor cylinder inlets 108 and outlets 110 of gas processing system 100 each feature a one-way valve that allows flow either into (inlet) or out of (outlet) the compressor cylinder, while inhibiting flow in the opposite direction. Each valve can have multiple flow apertures in parallel. The inlets and outlets operate in pairs, each pair operating in a respective stroke direction of the shaft. For example, during the stroke of the piston from right to left there will be an opening of the right inlet 108 and the left outlet 110, at different points during the stroke. Similarly, during the return stroke from left to right there will be an opening of the left inlet 108 and the right outlet 110 and different points during the stroke, while the right inlet and left outlet remain closed. During this return stroke from left to right, the seal end of the cylinder will be subjected to a rise of pressure to at least the outlet pressure of the compressor. This high pressure will be progressively reduced along the shaft through various stages, beginning with pressure breaking rod ring 138. During the stroke from right to left, the instantaneous pressure at the pressure breaking rod ring will at times be below the compressor inlet or suction pressure, and flow in conduit 124 can be in the opposite direction, toward the sealing system. Thus, not only does the sealing system need to withstand high pressures it must also accommodate extreme pressure waves or cycles that may fluctuate very rapidly.

The seal housings are all connected axially to end plate 120 by tie rods 158 threaded into the distal seal housing containing the pressure breaking rod ring, to hold the stack of seal housings together for transport and assembly. Tie rods 158 can also provide an alignment function.

Figure 7:
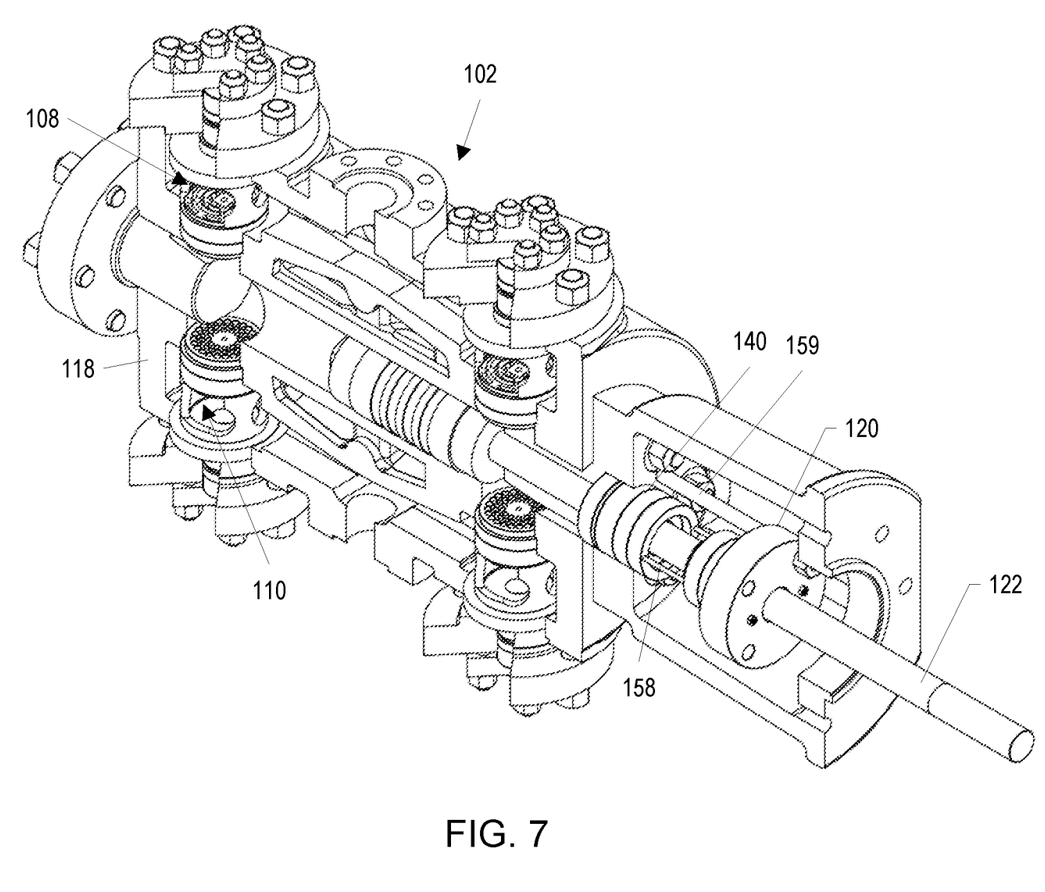
FIG. 7 is an exploded view of the compressor portion of FIG. 3.

Referring next to FIG. 7, end plate 120 and its connected stack of seal housings 140, aligned and held together by tie rods 158, is inserted into the bore of compressor housing 118 and held in place by housing bolts 159.

Figure 8:
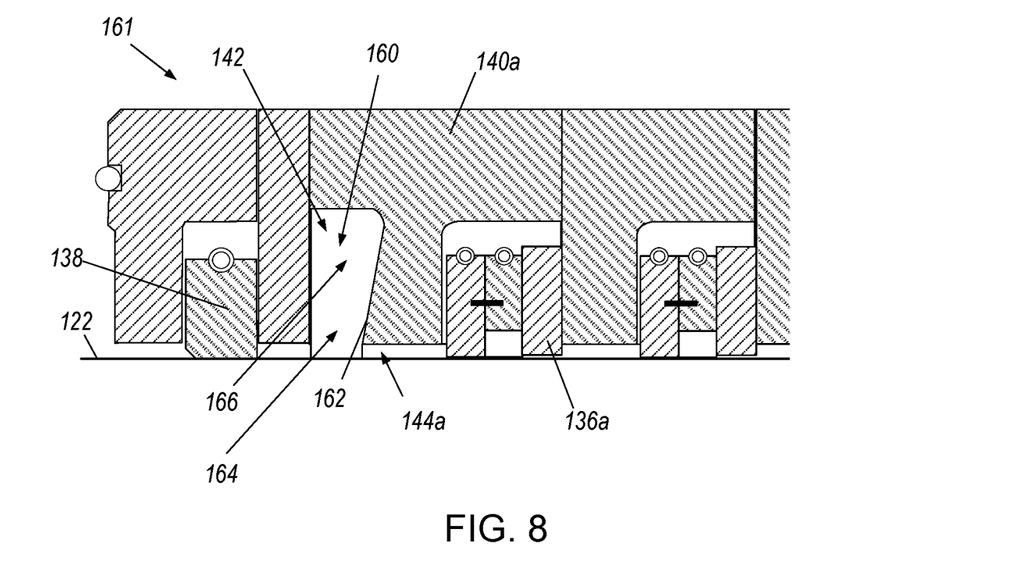
FIG. 8 is a partial cross-sectional view of a multi-stage sealing system with a sloping expansion chamber.

In some implementations, an expansion chamber includes an enlarged head portion that results in an increased volume of the expansion chamber. Referring to FIG. 8, an expansion chamber 142 is in the form of a bore 160 in seal housing 136a of packing case 161. Bore 160 includes a sloping bottom. In this example, the expansion chamber 142 is defined by a sloping bore bottom surface 162 and an outside surface of bore 160. The slope of the bore bottom surface 162 is such that the width of expansion chamber 142 at the shaft is less than the width of the expansion chamber 142 away from the shaft. The expansion chamber 142 includes a neck portion 164 and a head portion 166.

Figure 9:
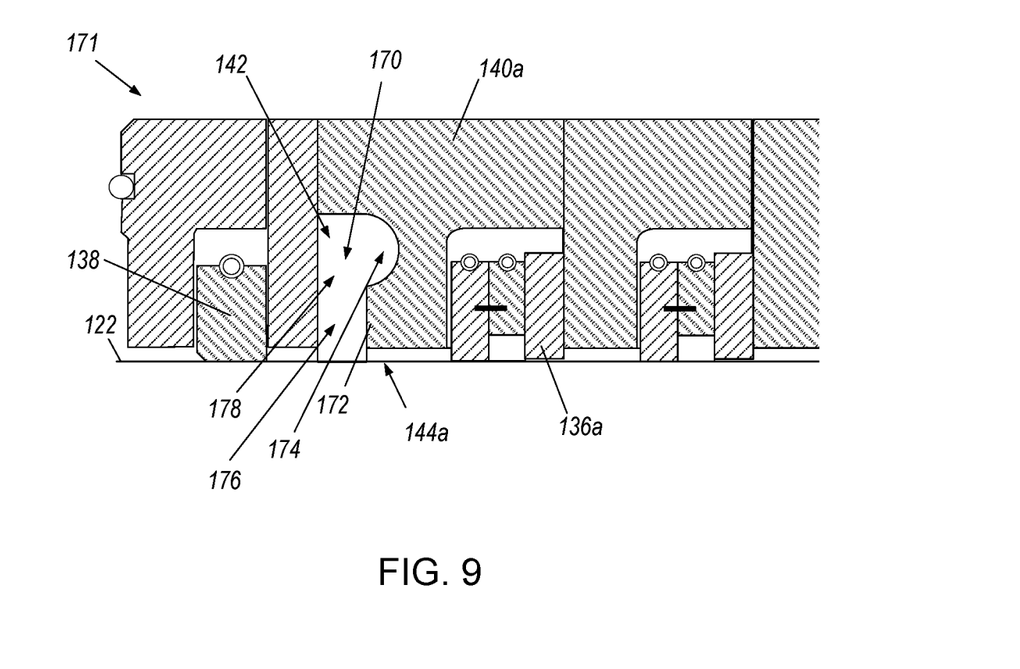
FIG. 9 is a partial cross-sectional view of a multi-stage sealing system with a lobed expansion chamber.

Referring next to FIG. 9, an expansion chamber 142 is in the form of a lobed bore 170 in seal housing 136a of packing case 171. In this example, the expansion chamber 142 is defined by bore bottom surface 172, an annular groove 174 in the bottom of bore bottom surface 172, and an outside surface of the bore. In this case, expansion chamber 142 includes a neck portion 176 and a head portion 178.

In the example shown in FIG. 9, annular groove 174 is shown with a rounded bottom. An annular groove of an expansion chamber can, however, have other profiles, such as a square bottom, u-shaped, or vee-shaped.

Figure 10:
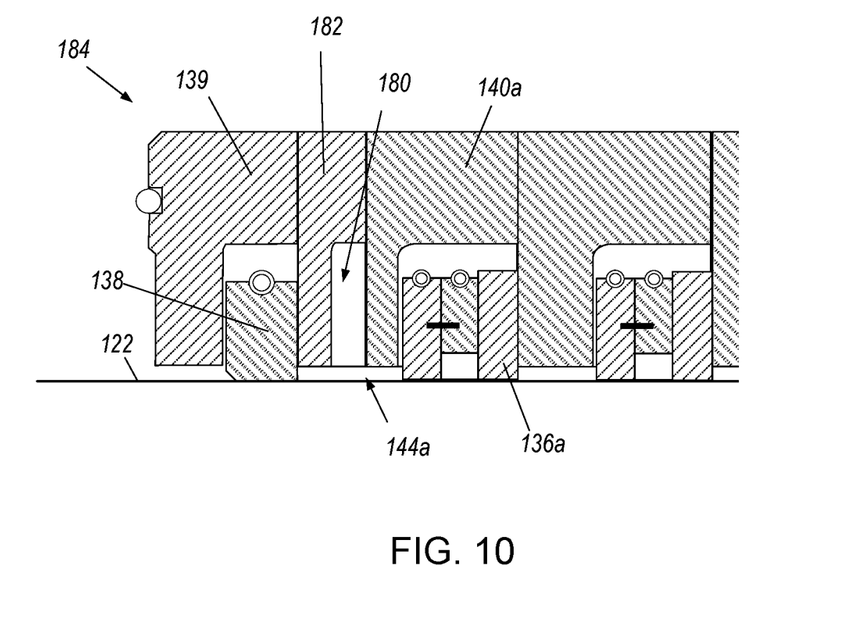
FIG. 10 is a partial cross-sectional view of a multi-stage sealing system with an expansion chamber formed in a retaining plate for a pressure breaking rod ring.

In some implementations, an expansion chamber is included in a component other than a seal housing. Referring to FIG. 10, an expansion chamber 142 is in the form of an annular bore 180 in plate 182 of packing case 184. Pressuring breaking rod ring 138 is held between pressure breaking rod ring housing 139 and plate 145. The face of seal housing 136a of packing case 182 adjoins bore 180.

Figure 11:
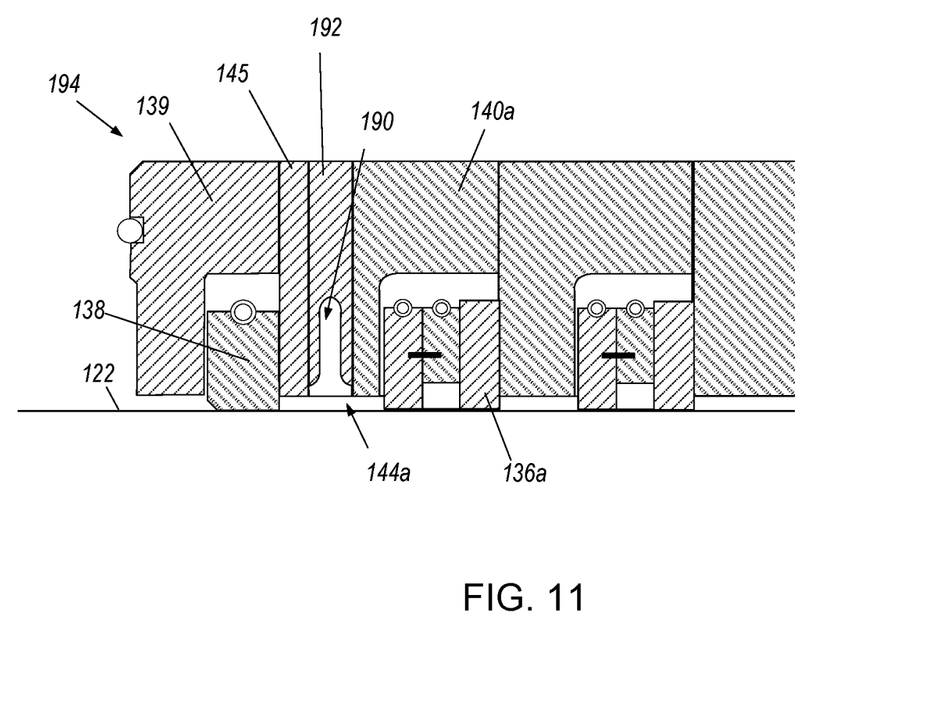
FIG. 11 is a partial cross-sectional view of a multi-stage sealing system with an expansion chamber plate installed between a retaining plate for a pressure breaking rod ring and a seal housing.

Referring to FIG. 11, an expansion chamber 142 is in the form of an annular bore 190 in expansion chamber plate 192 of packing case 194. Expansion chamber plate 192 is held between plate 145 and sealing housing 136a.

In the example shown in FIG. 11, the expansion chamber is included in a plate. In other implementations, the expansion chamber may be included in a sleeve, ring, or other member. In certain implementations, an expansion chamber can be included in a member that is partially housed in another component of the packing case, such as plate 145 or seal housing 136a.

Figure 12:
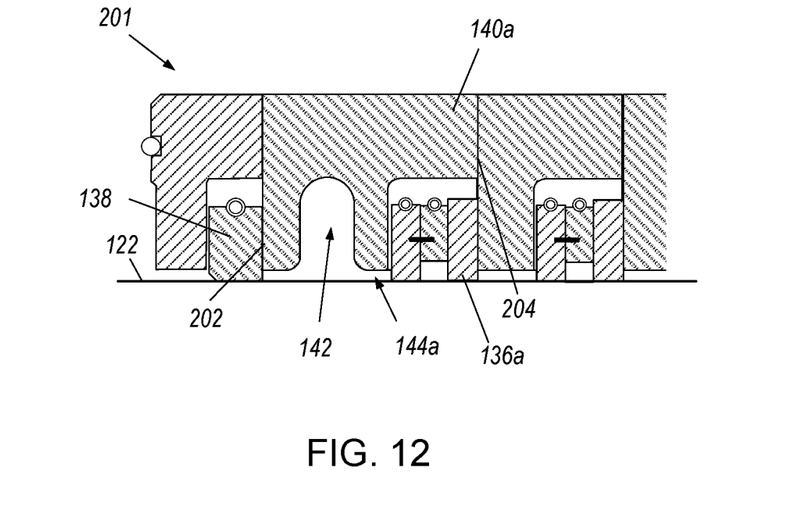
FIG. 12 is a partial cross-sectional view of a multi-stage sealing system with an expansion chamber in an intermediate pressure space along the length of a seal housing.

In some cases, an expansion member is at an intermediate location along the shaft bore of a seal housing, between the two opposing ends of the seal housing. Referring to FIG. 12, expansion chamber 142 is an annular groove 200 between an inside face 202 and an outside face 204 of seal housing 144a of packing case 201. In the example shown in FIG. 12, expansion chamber 142 has a bell-shaped cross-section. An annular groove of an expansion chamber can, however, have other profiles, such as a square bottom, u-shaped, sawtooth-shaped, or vee-shaped. The profile can be symmetrical or non-symmetrical. For example, a groove can have a slanting profile (e.g., swept-forward, swept-back).

Figure 13:
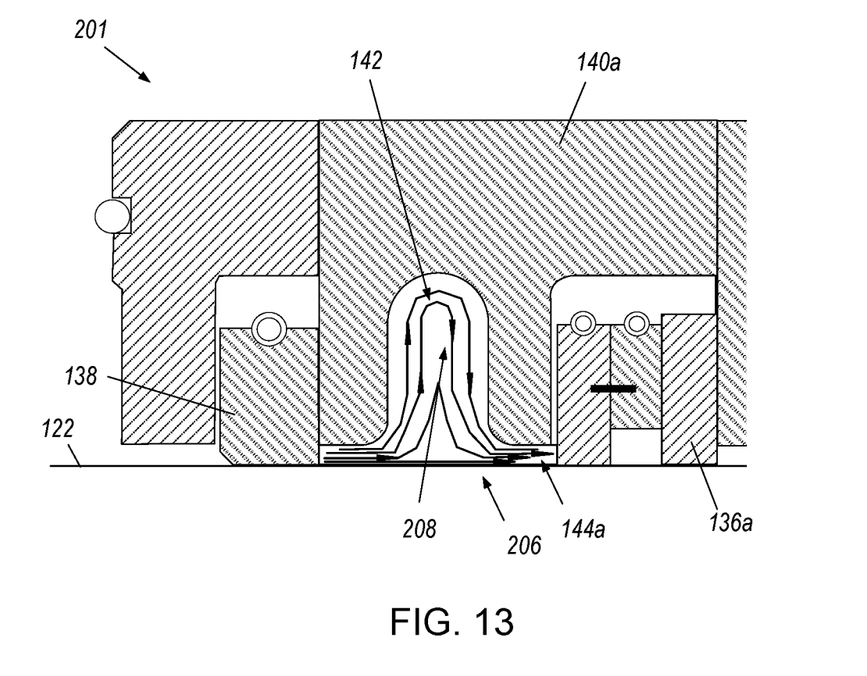
FIG. 13 illustrates gas flow in a multi-stage sealing system including an expansion chamber.

In various implementations, a portion of the gas flowing through the seals of packing case is diverted into an expansion chamber. Referring to FIG. 13, flow lines 206 illustrate the flow of gas into out of expansion member 142. Flow lines 208 represent the portion of gas that is diverted into expansion chamber 142. A diversion of the gas into expansion chamber 142 may also occur when gas is moving in the opposite direction (e.g., during a return stroke). In each case, the diverted gas returns to the main stream of gas.

In the examples shown above with respect to FIGS. 1 through 6, the pressure breaker is implemented in the form of a rod ring. In some implementations, a pressure breaker can be a plate with vanes, orifices, or other features that control flow through across or through the pressure breaker.

In implementations described above, a progressive seal system includes a single expansion chamber between the pressure breaker and the first seal outside of the pressure breaker. Other implementations are contemplated. For example, in some implementations, a multi-stage sealing system includes multiple expansion chambers.

Figure 14:
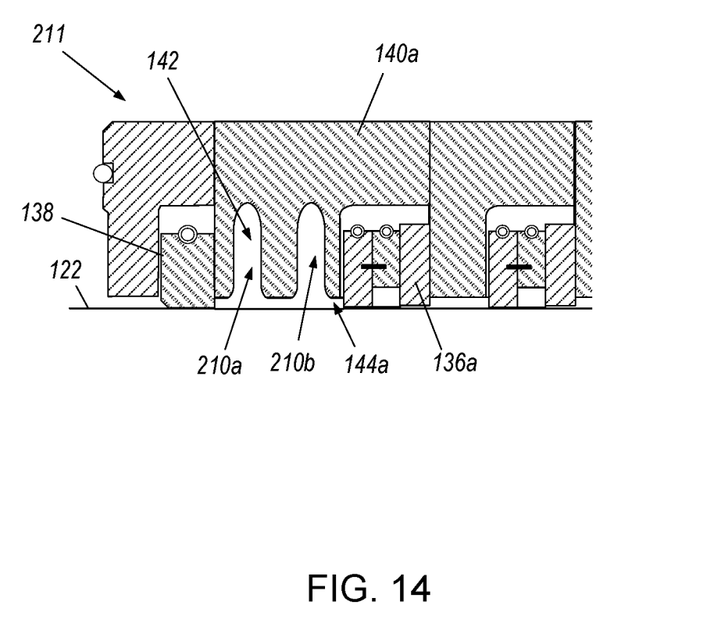
FIG. 14 is a cross-section view of a multi-stage sealing system including multiple expansion chambers.

Referring next to FIG. 14, multi-stage sealing system 114 includes two expansion chambers 210a and 210b included in housing 140a of packing case 211 between the pressure breaker and the next seal. Additional expansion chambers can be included. In certain implementations, an expansion chamber is included between one or more other adjacent seals, for example, between seals 136a and 136b, 136b and 136c, or both (see FIG. 6).

In various housings described above, the expansion chamber has been shown as an annular groove. An expansion chamber can be of a form that is not annular. For example, an expansion chamber can be a pocket or slot. A housing can include any number of expansion chambers. In one example, expansion chambers are provided as a ring of pockets on the face of a housing that surrounds the main bore of the housing.

In the above-described examples, an expansion chamber has been integrated into the sealing system. However, the principles discussed above can be applied to existing multistage sealing systems by providing appropriate retrofit hardware. As one example, a packing case can be removed from an existing reciprocating compressor and the seal stack disassembled. The first housing outside of the pressure breaker can be replaced with a housing having an expansion chamber such as one of the housings described above relative to FIG. 6, 9, 10, or 11. The retrofitted packing case can be reassembled and reinstalled in the compressor.

In certain implementations, two or more compressors are coupled in series to create higher working pressures. Expansion chambers can be included in packing cases for some or all of the compressors. In one example, an expansion chamber is included in only the last compressor in the series.

The above systems have been described with respect to a reciprocating compressor, in which shaft power does work on the process gas to create a high pressure gas flow that can be put to work elsewhere in the system. The sealing systems described herein can, for example, also be implemented in reciprocating pumps. In addition, the same sealing principles can be applied to some engines. For example, a sealing system including an expansion chamber can be included in a linear reciprocating gas engine that uses a high pressure flow of gas to drive a shaft back and forth in a reciprocating manner. In one implementation, a progressive sealing system with an expansion chamber is included in a natural gas engine.

As used herein, "pressure breaker" means a device or combination of devices that meters or restricts a flow of gas from one region to another. Examples of a pressure breaker include a ring or a plate. A pressure breaker can include a combination of two or more plates, two or more rings, or a combination of one or more rings, plates, or other flow control elements.

As used herein, "chamber" means an at least partially enclosed space.

As used herein, "expansion chamber" means a chamber that increases the volume of a vessel or of a space in an assembly of components in which a fluid resides.

As used herein, "adjoining", as it relates to a space, means adjacent to, and in fluid communication with, another space.

As used herein, a "driver" means a device that supplies mechanical energy to operate a system.

As used herein, a "housing" may completely or only partially enclose the component(s) that it houses.

As used herein, "progressive" refers to a sealing system having multiple sealing members between a high pressure point and a low pressure point. In many cases, such systems progressively reduce the pressure in stages between the high and low pressure points.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A reciprocating compressor, comprising:
   a compression cylinder defining a compression chamber;
   a driver;
   a rod coupled between the driver and the compression cylinder; and
   a packing case through which the rod passes;
   wherein the driver is operable to reciprocate the rod such that gas is compressed in the compression chamber,
   wherein the packing case is configured to inhibit the gas from flowing out of the compression chamber during reciprocation, wherein the packing case comprises:
      a pressure breaker positioned at a high pressure end of the packing case and configured to meter a flow of the gas from the compression chamber;
      a plurality of seals through which the rod passes, each seal being positioned along the rod between the pressure breaker and a low pressure end of the packing case;
      a housing configured to hold at least a first seal and a second seal of the plurality of seals;
      an expansion chamber comprising an annular groove formed in an inner surface of the packing case and in fluid communication with an intermediate pressure space between the pressure breaker and the first seal, the annular groove and the intermediate pressure space defining a first volume; and
      a pressure space defined between the first seal and the second seal and defining a second volume that is less than the first volume.

2. The reciprocating compressor of claim 1, wherein the expansion chamber is configured to reduce peak gas pressure on one or more of the first seal and the second seal during reciprocation.

3. The reciprocating compressor of claim 1, wherein the expansion chamber is configured to reduce a rate of change of pressure on one or more of the first seal and the second seal during reciprocation.

4. The reciprocating compressor of claim 1, wherein the expansion chamber is configured to slow a fill rate of the intermediate pressure space during reciprocation.

5. The reciprocating compressor of claim 1, wherein the plurality of seals through which the rod passes comprises at least a third seal positioned toward the low pressure end from the second seal, wherein the expansion chamber is configured to reduce pressure on the third seal during reciprocation.

6. The reciprocating compressor of claim 1, wherein packing case comprises a plate between the pressure breaker and the first seal, wherein the annular groove is at least partially defined by a surface of the plate.

7. The reciprocating compressor of claim 1, wherein the packing case further comprises an expansion chamber member, wherein the annular groove is in an inner surface of the expansion chamber member.

8. A progressive sealing system for a reciprocating machine, comprising:
   a pressure breaker positioned at a high pressure end of a packing case and configured to meter a flow of gas from a compression chamber of the reciprocating machine;
   an end plate configured to couple the progressive sealing system to a housing of a cylinder of the reciprocating machine;
   a plurality of seals through which the rod passes, each seal being positioned along the rod between the pressure breaker and a low pressure end of the packing case;
   a first seal housing configured to hold a first seal of the plurality of seals; and
   a second seal housing configured to hold a second seal of the plurality of seals;
   wherein the first seal housing comprises a bore comprising an inner surface, the inner surface of the bore of the first seal housing and an outer surface of the rod defining an intermediate pressure space when the rod is received in the bore,
   wherein the first seal housing comprises an expansion chamber comprising an annular groove formed in the inner surface of the first seal housing and in fluid communication with the intermediate pressure space between the pressure breaker and the first seal, the annular groove and the intermediate pressure space defining a first volume, and the annular groove comprises a first depth and a first width and is configured to reduce pressure on the first seal during reciprocation, and
   wherein a pressure space is defined between the first seal and the second seal and defines a second volume that is less than the first volume.

9. The progressive sealing system of claim 8, wherein the expansion chamber is configured to reduce peak gas pressure on one or more of the first seal and the second seal during reciprocation.

10. The progressive sealing system of claim 8, wherein the expansion chamber is configured to reduce a rate of change of pressure on one or more of the first seal and the second seal during reciprocation.

11. The progressive sealing system of claim 8, wherein the annular groove comprises a head portion and a neck portion, wherein the neck portion adjoins the intermediate pressure space, and wherein the head portion is wider than the neck portion.

12. The progressive sealing system of claim 8, wherein the annular groove comprises a lobed annular groove in the inner surface of the first seal housing.

13. The progressive sealing system of claim 8, wherein the annular groove comprises a sloping bottom.

14. The progressive sealing system of claim 8, wherein the annular groove comprises a bell-shaped annular groove in the inner surface of the first seal housing.

15. The progressive sealing system of claim 8, further comprising at least one additional expansion chamber.

16. The progressive sealing system of claim 15, wherein the at least one additional expansion chamber is between the expansion chamber and the second seal.

17. The progressive sealing system of claim 8, further comprising one or more additional seals of the plurality of seals, wherein the one or more additional seals are configured to receive the rod between the second seal and the end plate, and wherein the expansion chamber is configured to reduce pressure on at least one of the one or more additional seals during reciprocation.

18. The progressive sealing system of claim 17, further comprising at least one additional expansion chamber configured to reduce pressure on at least one of the plurality of seals during reciprocation, wherein the at least one additional expansion chamber is between the second seal and the end plate.

19. A method of sealing a combustion chamber of a reciprocating machine, the method comprising:

positioning, within a packing case for a rod of the reciprocating machine, a housing that defines an expansion chamber in front of a stack of seals, each seal being positioned along the rod between a high pressure end and a low pressure end of the packing case, wherein the expansion chamber comprises an annular groove formed in an inner annular surface of the housing, wherein the annular groove comprises a first depth and a first width;

positioning, within the packing case, a pressure breaker configured to meter a flow of gas from the compression chamber, the pressure breaker positioned at the high pressure end of the packing case in front of the housing to create an intermediate pressure space that includes the expansion chamber, wherein the expansion chamber is between the pressure breaker and a first seal of the stack of seals that is closest to the pressure breaker to define a first volume, wherein a pressure space is defined between the first seal and a second seal of the stack of seals and has a second volume that is less than the first volume; and coupling the packing case with the rod.

20. A method of reducing wear on seals of a packing case to extend reliability and useful life of the seals, the method comprising:

forming an expansion chamber, wherein the expansion chamber comprises an annular groove formed in an inner surface of the packing case, wherein the annular groove comprises a first depth and a first width;

positioning the seal housing in front a stack of seals of the packing case; and positioning a pressure breaker ring at a high pressure end of the packing case, the pressure breaker ring being configured to meter a flow of gas from a compression chamber to create an intermediate pressure space including the expansion chamber between the pressure breaker ring and a first seal of the stack of seals to define a first volume, wherein a pressure space is defined between the first seal and a second seal of the stack of seals and has a second volume that is less than the first volume, the second seal being closer to a low pressure end of the packing case than the first seal.

21. The method of reducing wear on seals of claim 20, wherein forming the expansion chamber comprises forming the annular groove in an inner annular surface of a seal housing configured to hold the first seal.

* * * * *